Patented Aug. 14, 1945

2,382,399

UNITED STATES PATENT OFFICE 2,382,399

TREATMENT OF CELLULOSE

Robert B. Darling, Hopewell, Va., assignor to Hercules Powder Company, Wilmington, Del., a corporation of Delaware No Drawing. Application June 20, 1941, Serial No. 398,981

10 Claims. (Cl. 260—229)

This invention relates to improved methods for the preparation of purified cellulose and to the product formed thereby. It particularly relates to the preparation of stabilized purified cotton linters capable of imparting improved properties to organic acid esters of cellulose prepared therefrom.

The properties of chemical cellulose are affected to a large extent by certain constituents adsorbed from the processing water used in its purification. The presence of calcium, for example, increases the heat stability of chemical cellulose and also of cellulose esters, such as the acetate prepared therefrom, but results in the formation of haze in such cellulose esters. The presence of sodium on the other hand retards such haze formation but causes loss of stability and reactivity of the cellulose.

The use of natural water as from wells, springs, rivers, lakes, etc., for processing chemical cellulose has, for this reason, proved disadvantageous due to the contained calcium hardness in the form of carbonates, sulfates and chlorides. Removal of the calcium hardness as by treatment with sodium zeolite which replaces calcium by sodium, has not proved entirely satisfactory since the presence of sodium decreases heat stability. Also, the improved heat stability attainable with calcium is, of course, not realized when the calcium is removed. Likewise, treatment with hydrogen zeolite though substantially eliminating haze formation results in a product of decreased heat stability. Other types of chemical treatment are also possible but are objectionable for similar reasons. In addition, since natural waters are subject to regional and seasonal fluctuations, the uncertainty regarding the varying objectionable calcium content of the water offers obvious processing difficulties. In view of the conflicting effects of the various metal ions it has been a difficult problem to produce a highly purified chemical cellulose having high reactivity and stability, and from which organic acid esters having high heat stability and substantial freedom from haze could be made.

It is, therefore, an object of this invention to provide an improved method of preparing chemical cellulose of high reactivity.

It is a further object of the invention to prepare chemical cellulose from which organic acid esters of cellulose, relatively free of haze and of improved stability, may be obtained.

It is a still further object of the invention to prepare a relatively haze-free organic ester of cellulose.

A further object of the invention is an improved method of treating the water used in the processing of chemical cellulose whereby an improved product of high reactivity and heat stability is obtained.

A still further object of the invention is the treatment of the water used in the processing of chemical cellulose whereby a metal ion, having decidedly beneficial effects on the chemical cellulose and on organic acid esters produced therefrom, is introduced and at least partially adsorbed by the cellulose.

Another object of the invention is an improved method of treating chemical cellulose, whereby the deleterious effects of adsorbed calcium ions are neutralized by the introduction of a different metal ion while at the same time the beneficial effects of the calcium ion are retained.

These and other objects will be apparent as the description proceeds.

The objects of my invention are in general accomplished by adding to the chemical cellulose during processing thereof, a compound of magnesium. Chemical cellulose so treated has improved reactivity and stability and when manufactured into, for example, cellulose acetate by known acetylation methods produces a product free of haze and possessing increased heat stability.

In the production of chemical cellulose or chemical cotton from cotton linters the linters may be purified in any well-known manner as by a caustic soda boil and various acid and/or alkaline bleach treatments accompanied by one or more washes with water. If desired, the bleached linters may then be treated with softened or dead-soft water followed by addition of magnesium. However, I have found that the magnesium addition may be very conveniently and expeditiously carried out by utilizing the wash water as a carrier of same. Thus the linters are treated with a solution of a magnesium compound of at least slight water solubility from which solution the linters adsorb magnesium.

Thus according to one method of treatment the processing or wash water is first subjected to any of the well-known water softening treatments, as for example, a hydrogen zeolite treatment, to remove calcium and sodium ions, and the softened water is then treated with a soluble magnesium salt to introduce 5–100 P. P. M. of magnesium. The resulting water is then used in the processing of the cotton linters to produce the desirable effects in accordance with the present invention.

According to another method the processing water comprising natural water containing calcium ions in any quantity up to about 100 P. P. M. and sodium ions is treated with a soluble magnesium salt. The increased magnesium ion concentration, by some physical or chemical mechanism not definitely understood, induces the desired stability and haze properties in the chemical cellulose processed therein without necessarily eliminating calcium and sodium.

In accordance with a third method of treatment the processing water, such as a natural water containing calcium and sodium, may be passed through a bed of zeolite mineral which has previously been regenerated with a magnesium salt instead of the sodium salt generally used for this purpose. The resulting water is quite suitable for the processing of chemical cellulose, producing a product of good haze and stability characteristics.

The chemical cellulose may be treated at any stage of the purification treatment and in any suitable manner. The magnesium may be added to the processing water prior to washing the chemical cellulose or it may be added to a slurry of the chemical cellulose in the processing water. Preferably the magnesium is added in the final wash treatment as in this way there is less chance that a portion of the magnesium will be removed during the purification treatment. If desired, the magnesium may be added directly to the chemical cellulose in the form of a solution of a soluble salt of magnesium. In some cases it may be desirable to add both calcium and magnesium for maximum stabilization. When this is done the ratio of magnesium to calcium should be maintained within the limits to be pointed out hereinafter. Where magnesium is absorbed from an excess of processing water, it is desirable to maintain pH of the water above about 6.

The magnesium is added to the processing water or to the chemical cellulose in the form of water-soluble compounds. Salts such as magnesium sulfate, magnesium chloride, magnesium bromide, magnesium nitrate, etc., are suitable compounds, although in some cases compounds of only slight solubility such as the bicarbonate, carbonate, hydroxide, etc., may be used.

The amount of magnesium added will depend upon the conditions of treatment. Where the processing water or linters contain calcium, the magnesium should be added in an amount such that the resulting ratio of magnesium to calcium in the treating water and in the final product is not less than about 1 to 3 as ratios less than this tend to the formation of haze in the resulting organic acid ester. Preferably the magnesium-calcium ratio is maintained at a value greater than 1 to 2.

Where the processing water is first chemically treated to remove calcium, as by hydrogen zeolite, the amount of magnesium added may vary from about 5 to about 100 parts per million based on the weight of the solution but is preferably maintained within the limits of about 10 to 100 parts per million to assure an effective treatment. In all cases the magnesium will be present in a quantity to insure a ratio of adsorbed magnesium to adsorbed calcium in the final cellulose of not less than 1 to 3.

The amount of magnesium used when direct addition is made to the chemical cellulose will depend somewhat on the quantity and type of metal ions already present in the material. Where calcium is present, the amount of magnesium added should be such that the magnesium-calcium ratio is within the limits heretofore given, i. e., not less than 1 to 3. The amount of magnesium added to a slurry of cellulose in water will usually vary from 0.01% to 0.20% based on the weight of the chemical cellulose. Where little or no water is drained from the cellulose prior to drying the amount may be as low as the quantity desired in the cellulose.

The magnesium in all cases will be added in a quantity or will be present in treating solutions in a quantity such that the cellulose after treatment contains magnesium in a quantity between about 0.001% and about 0.03% of the weight of the cellulose and in a ratio to any calcium present of at least 1 to 3. Calcium will be present in a quantity no more than 0.03% and may be absent; however, the usual quantity desired will be between 0.003% and 0.015%.

The above treatments may be carried out under atmospheric conditions of temperature and pressure though it will be realized that other conditions may sometimes be possible and desirable.

The following examples are given to illustrate the invention but should not be construed as limiting the scope thereof.

*Example 1*

Natural water containing 48 parts per million of calcium as $CaCO_3$ and 35 parts per million of sodium as $Na_2CO_3$ was mixed with chemical cellulose (purified cotton linters) to form a 2% slurry. Fifty parts per million magnesium sulfate, based on the weight of solution, were added to the slurry and the mixture agitated approximately three hours at atmospheric temperature and pressure, after which it was pumped to the driers without further treatment. The cellulose recovered from this water produced, on acetylation, haze-free solutions.

Chemical cellulose so treated yielded cellulose acetate dope solutions having haze values of 5–12 P. P. M. The cellulose itself, when subjected to constant heating at 180° C. for 8 hours, gave heat test values of 8–9. In comparing these values with those of identical chemical cellulose processed with natural water alone, it was found that turbidities or haze values ranged 15–30 or more P. P. M. and heat stability values were in most cases 10–16, in some cases more.

*Example 2*

A charge of purified chemical cellulose was treated in slurry form with a hydrogen zeolite softened water to which had been added 20 parts per million calcined magnesite. The slurry was agitated at atmospheric temperature and pressure for approximately three hours and then pumped to the driers. The resulting cellulose product had a heat stability of 9. The acetate prepared from this material had a turbidity or haze of 12 P. P. M. as compared with 35 P. P. M. for a sample processed with untreated water.

*Example 3*

A quantity of water was processed by passing natural water through a bed of zeolite mineral which had previously been regenerated twice with a 5% solution of magnesium sulfate. Purified chemical cellulose was washed and dried from this magnesium-treated water in the usual manner. Cellulose acetate prepared from the resulting pulp had a turbidity of 10 P. P. M. as compared with 22 P. P. M. for a sample washed with untreated water.

My invention provides several advantages as compared to previously known methods. Thus where processing water containing calcium salts has hitherto been used the calcium has caused the formation of a haze in the organic acid ester made from the purified cellulose. Where it was attempted to remove the calcium by treatment with sodium zeolite the sodium had an adverse effect on reactivity of the purified cellulose and stability of the organic acid ester. Treatment with hydrogen zeolite, though eliminating haze to a large extent, likewise resulted in poorer stabilities. Treatment with magnesium in accordance with the present invention overcomes these difficulties and produces an improved product of increased reactivity and stability and from which an organic acid ester, such as cellulose acetate, cellulose acetate-propionate, cellulose acetate-butyrate, etc., free of haze and of increased stability may be made. When the magnesium is added to a processing water containing calcium, the haze forming characteristics of the calcium are counteracted while the beneficial effects of the calcium on stability are retained. When the magnesium is added to a processing water which has been chemically treated to remove the calcium, an improved cotton cellulose of high reactivity and stability is obtained.

Reactivity, as used in this specification, is that characteristic of the purified cellulose by virtue of which it esterifies, i. e., acetylates, smoothly into a dope which is free from unesterified fibers and easily filtered.

Stability is that characteristic of the purified cellulose and the organic acid ester made therefrom by virtue of which the materials are less susceptible to decomposition particularly by heat. This factor may be determined by heating cotton linters at 180° C. for 8.0 hours and comparing the decomposition (color developed) with samples of known good stability which have been heated for varying lengths of time. The higher the numerical value the lower the heat stability. Thus a heat stability of 8 is very good while 12-14 is average, and 15 or above is considered poor.

Haze formation is evidenced by a smoky or cloudy appearance of the esterification, i. e., acetylation, dope or the organic acid ester and is thought by some to be caused by the formation of a colloidal precipitate. Regardless of the theoretical explanation of haze formation, the use of the present invention substantially eliminates this objectional condition. Where turbidity or haze values are referred to herein, these values are obtained by determining the turbidity of a cellulose ester dope or solution by means of a Betz-Hellige Turbidimeter, which is described in Industrial and Engineering Chemistry, Analytical edition, 7, No. 4, page 262 (1935), expressing the haze on the basis of equivalent parts per million of barious sulfate.

It will be understood that the details and examples hereinbefore set forth are illustrative only, and that the invention as broadly described and claimed is in no way limited thereby.

What I claim and desire to protect by Letters Patent is:

1. In the preparation of cellulose in a form suitable for esterification to an ester of a lower fatty acid of improved heat stability and haze characteristic, a process which comprises adding a magnesium compound to a processing water containing 0-100 P. P. M. of dissolved calcium and less than 5 P. P. M. of dissolved magnesium, the quantity of magnesium compound added being sufficient to form a solution containing 5-100 P. P. M. of dissolved magnesium and containing at least one-third as much magnesium as calcium, and treating purified cellulose with the resulting solution to incorporate therein a quantity of magnesium between about 0.001% and about 0.03% by weight of the cellulose.

2. In the preparation of cellulose in a form suitable for esterification to an ester of improved heat stability and haze characteristic, a process which comprises adding a magnesium compound to a processing water containing dissolved calcium in amount not more than about 100 P. P. M. and an amount of dissolved magnesium less than one-third of the amount of dissolved calcium, the quantity of magnesium compound added being sufficient to form a solution containing 5-100 P. P. M. of dissolved magnesium and containing at least one-third as much magnesium as calcium, and treating purified cellulose with the resulting solution to incorporate therein a quantity of magnesium between about 0.001% and about 0.03% by weight of the cellulose.

3. In the preparation of cellulose in a form suitable for esterification to an ester of a lower fatty acid and possessing improved heat stability and haze characteristic, a process which comprises removing substantially all of the dissolved calcium from a calcium-containing processing water, adding a magnesium compound to the water to form a solution containing 5-100 P. P. M. of dissolved magnesium, treating purified cellulose with the resulting solution, removing excess water from the treated cellulose, and drying the treated cellulose to obtain a substantially dry product containing magnesium in a quantity between about 0.001% and about 0.03% by weight of the cellulose.

4. In the preparation of a cellulose ester of a lower molecular weight fatty acid possessing improved heat stability and being substantially haze-free in solution, a process which comprises adding a magnesium compound to a processing water containing 0-100 P. P. M. of dissolved calcium and less than 5 P. P. M. of dissolved magnesium, the quantity of magnesium compound added being sufficient to form a solution containing 5-100 P. P. M. of dissolved magnesium and containing at least one-third as much magnesium as calcium, treating purified cellulose with the resulting solution, removing excess water from the treated cellulose, drying the treated cellulose, and esterifying the treated cellulose with a lower fatty acid to form a stable, substantially haze-free lower fatty acid ester of cellulose.

5. In the preparation of a lower fatty acid ester of cellulose which is characterized by improved heat stability and forming substantially haze-free solutions, a process which comprises adding a magnesium compound to a processing water containing dissolved calcium in amount not more than about 100 P. P. M. and an amount of dissolved magnesium less than one-third of the amount of dissolved calcium, the quantity of magnesium compound added being sufficient to form a solution containing 5-100 P. P. M. of dissolved magnesium and containing at least one-third as much magnesium as calcium, treating purified cellulose with the resulting solution to incorporate therein a quantity of magnesium between about 0.001% and about 0.03% by weight of the cellulose, removing the excess water, drying the cellulose, and esterifying the treated cellulose with a lower fatty acid to form a stable, substantially haze-free lower fatty acid ester of cellulose.

6. In the preparation of a lower fatty acid ester of cellulose which is characterized by improved heat stability and haze-forming characteristics, a process which comprises removing substantially all of the dissolved calcium from a calcium-containing processing water, adding a magnesium compound to the water to form a solution containing 5-100 P. P. M. of dissolved magnesium, treating purified cellulose with the resulting solution, removing the water from the treated cellulose, and esterifying the treated cellulose with a lower fatty acid to form a stable, substantially haze-free lower fatty acid ester of cellulose.

7. In the preparation of cellulose in a form suitable for esterification to an ester of a lower fatty acid, which is characterized by improved heat stability and haze-forming properties, a process which comprises adding magnesium chloride to a processing water containing 0-100 P. P. M. of dissolved calcium and less than 5 P. P. M. of dissolved magnesium, the quantity of magnesium chloride added being sufficient to form a solution containing 5-100 P. P. M. of dissolved magnesium and containing at least one-third as much magnesium as calcium, and treating purified cotton linters with the resulting solution to incorporate therein a quantity of magnesium between about 0.001% and about 0.03% by weight of the linters.

8. In the preparation of cellulose in a form suitable for esterification to an ester of a lower fatty acid, which is characterized by improved heat stability and haze-forming properties, a process which comprises adding magnesium sulfate to a processing water containing 0-100 P. P. M. of dissolved calcium and less than 5 P. P. M. of dissolved magnesium, the quantity of magnesium sulfate added being sufficient to form a solution containing 5-100 P. P. M. of dissolved magnesium and containing at least one-third as much magnesium as calcium, and treating purified cotton linters with the resulting solution to incorporate therein a quantity of magnesium between about 0.001% and about 0.03% by weight of the linters.

9. In the preparation of cellulose in a form suitable for esterification to an ester of a lower fatty acid, which is characterized by improved heat stability and haze-forming properties, a process which comprises adding magnesium chloride to a processing water containing dissolved calcium in amount not more than about 100 P. P. M. and an amount of dissolved magnesium less than one-third of the amount of dissolved calcium, the quantity of magnesium chloride added being sufficient to form a solution containing 5-100 P. P. M. of dissolved magnesium and containing at least one-third as much magnesium as calcium, and treating purified cotton linters with the resulting solution to incorporate therein a quantity of magnesium between about 0.001% and about 0.03% by weight of the linters.

10. In the preparation of cellulose in a form suitable for esterification to an ester of a lower fatty acid, which is characterized by improved heat stability and haze-forming properties, a process which comprises adding magnesium sulfate to a processing water containing dissolved calcium in amount not more than about 100 P. P. M. and an amount of dissolved magnesium less than one-third of the amount of dissolved calcium, the quantity of magnesium sulfate added being sufficient to form a solution containing 5-100 P. P. M. of dissolved magnesium and containing at least one-third as much magnesium as calcium, and treating purified cotton linters with the resulting solution to incorporate therein a quantity of magnesium between about 0.001% and about 0.03% by weight of the linters.

ROBERT B. DARLING.